United States Patent [19]

Peterson et al.

[11] Patent Number: 5,535,588
[45] Date of Patent: Jul. 16, 1996

[54] FILTER ARRANGEMENT FOR SINGLE-ACTING TELESCOPIC HYDRAULIC CYLINDERS

[75] Inventors: Walter Peterson, Travelers Rest, S.C.; Alvin L. Janus, Stacy; Mark E. Joncas, Coon Rapids, both of Minn.

[73] Assignee: Dana Corporation, Toledo, Ohio

[21] Appl. No.: 238,843

[22] Filed: May 6, 1994

[51] Int. Cl.$^6$ .......................... F16D 31/02; B01D 27/10; B01D 21/30
[52] U.S. Cl. .............. 60/454; 60/477; 210/133; 210/136
[58] Field of Search .................. 60/453, 454, 477, 60/480; 210/133, 136, 418; 91/535, 173, 176

[56] References Cited

U.S. PATENT DOCUMENTS

| | | | |
|---|---|---|---|
| 3,190,445 | 6/1965 | Rosaen . | |
| 3,289,841 | 12/1966 | Quinting . | |
| 3,322,281 | 5/1967 | Gulick | 210/136 X |
| 3,656,621 | 4/1972 | Barthe | 210/133 |
| 3,744,244 | 7/1973 | Swoager | 60/454 |
| 4,003,397 | 1/1977 | Cooper | 60/454 X |
| 4,009,572 | 3/1977 | Cooper | 60/454 |
| 4,051,031 | 9/1977 | Suzuki | 210/133 |
| 4,268,384 | 5/1981 | Rosaen et al. | 210/133 |
| 4,322,290 | 3/1982 | Carl . | |
| 4,439,984 | 4/1984 | Martin | 60/454 |
| 4,657,040 | 4/1987 | Torres | 210/136 X |
| 5,334,309 | 8/1994 | Huggett et al. | 210/133 |

FOREIGN PATENT DOCUMENTS

| | | | |
|---|---|---|---|
| 1266818 | 10/1989 | Japan | 210/136 |
| 4016206 | 1/1992 | Japan | 210/136 |

*Primary Examiner*—John E. Ryznic
*Attorney, Agent, or Firm*—Millen, White, Zelano & Branigan

[57] ABSTRACT

A filter arrangement for a single acting, telescopic, hydraulic cylinder, useful to raise and lower a dump truck bed, is configured for installation in one line of a two-line dump pump to filter only hydraulic fluid returning to sump. This is accomplished by a first one-way check valve which blocks fluid flow through a filter element toward the hydraulic cylinder but allows fluid flow from the hydraulic cylinder to sump and a second one-way check valve, disposed in parallel with the filter element, to block flow to the sump from the hydraulic cylinder while allowing flow from the sump to the hydraulic cylinder so that returning hydraulic fluid passes through the filter element. Preferably the filter element is disposed in a spin-on filter assembly which includes the one-way check valves integral therewith.

6 Claims, 3 Drawing Sheets

5,535,588

FILTER ARRANGEMENT FOR SINGLE-ACTING TELESCOPIC HYDRAULIC CYLINDERS

FIELD OF THE INVENTION

The present invention relates to a filter arrangement for single-acting, telescopic, hydraulic cylinders. More particularly, the present invention relates to a filter arrangement for single-acting telescopic cylinder, wherein a pump withdraws hydraulic fluid from a sump with a first line and applies the hydraulic fluid to the cylinder with a second line to extend a piston rod from the cylinder and, thereafter, returns the hydraulic fluid to the sump through the same first and second lines when the piston rod retracts.

BACKGROUND OF THE INVENTION

Many dump trucks are equipped with what are known as two-line dump pumps, wherein a first line is connected from a pump to a sump, and a second line is connected from the pump to a single-acting, telescopic, hydraulic cylinder. These arrangements do not include a filter, resulting in contaminated hydraulic fluid which, if not changed with relative frequency, shortens the life of the pump and the hydraulic cylinder. Apparently, with two line pumps used in dump trucks, it is not feasible to filter hydraulic fluid as the fluid is pumped, so filtering is not performed.

The prior art does not address the problem of filtering hydraulic fluid in two-line dump truck arrangements. U.S. Pat. No. 4,322,290 to Carl discloses a filter in which the reverse flow bypasses a filter element; however, Carl does not suggest an arrangement wherein hydraulic oil need not be filtered while it is pumped and, therefore, does not suggest a solution to the problem of filtering hydraulic fluid used in two-line dump pumps.

U.S. Pat. No. 3,289,841 to Quinting discloses an arrangement for filtering fluid flowing in both directions through a filter, while U.S. Pat. No. 3,190,445 to Rosaen utilizes a pair of filters to filter fluid flowing in both directions. Both Quinting and Rosaen suggest filtering hydraulic fluid while the fluid is being pumped. U.S. Pat. No. 3,322,281 to Gulick discloses an arrangement which ensures that fluid flow is always in the same direction through a filter but does not suggest that hydraulic fluid need not be filtered while it is being pumped.

In view of the aforementioned considerations, there is a need for an arrangement for filtering hydraulic fluid utilized in two-line dump truck configurations.

SUMMARY OF THE INVENTION

It is a feature of the present invention to provide a new and improved arrangement which, in one embodiment, is of specific interest in applications such as filtering hydraulic oil pumped to telescope single-acting hydraulic cylinders which, for example, may be used to raise the beds of dump trucks.

With this and other features in mind, the present invention contemplates an improvement in an arrangement for filtering hydraulic fluid supplied by a pump from a sump to a hydraulic cylinder having a piston therein. The fluid enters the pump through a first line, is pressured by the pump, and exits the pump through a second line connected to the hydraulic cylinder to advance the piston within the cylinder against a load. When the pump is not pressurizing the liquid and the liquid is being pressurized only by the load, the liquid flows back through the second line through pump through the first line and into the sump. The improvement for this arrangement comprises a filter element disposed in one of the lines with a first one-way check valve disposed in series with the filter element and a second one-way check valve disposed in parallel with the filter element. The first one-way check valve in series with the filter element is oriented to open only for return flow from the hydraulic cylinder and to remain closed toward flow to the hydraulic cylinder from the pump. The second one-way check valve in parallel with the filter element is oriented to open only for flow from the pump toward the hydraulic cylinder. Accordingly, fluid flowing from the pump to the hydraulic cylinder bypasses the filter element, and return fluid, flowing from the hydraulic cylinder, flows through the filter element as it returns the sump. Consequently, the fluid available for subsequent advancement of the piston is clean.

In accordance with a preferred configuration of a filter assembly, an annular filter element is mounted in a housing attached to a base having first and second ports. A one-way check valve having a relatively high opening pressure is mounted between the first and second ports and oriented to open upon applying fluid pressure to the first port. Another one-way check valve, having a relatively low opening pressure, is disposed in communication with a central space defined by the annular filter element and is oriented to open upon applying fluid pressure to the second port with fluid which has passed radially through the annular filter element.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views and wherein.

DETAILED DESCRIPTION

FIGS. 1A and 1B: First Embodiment

Figure 1:
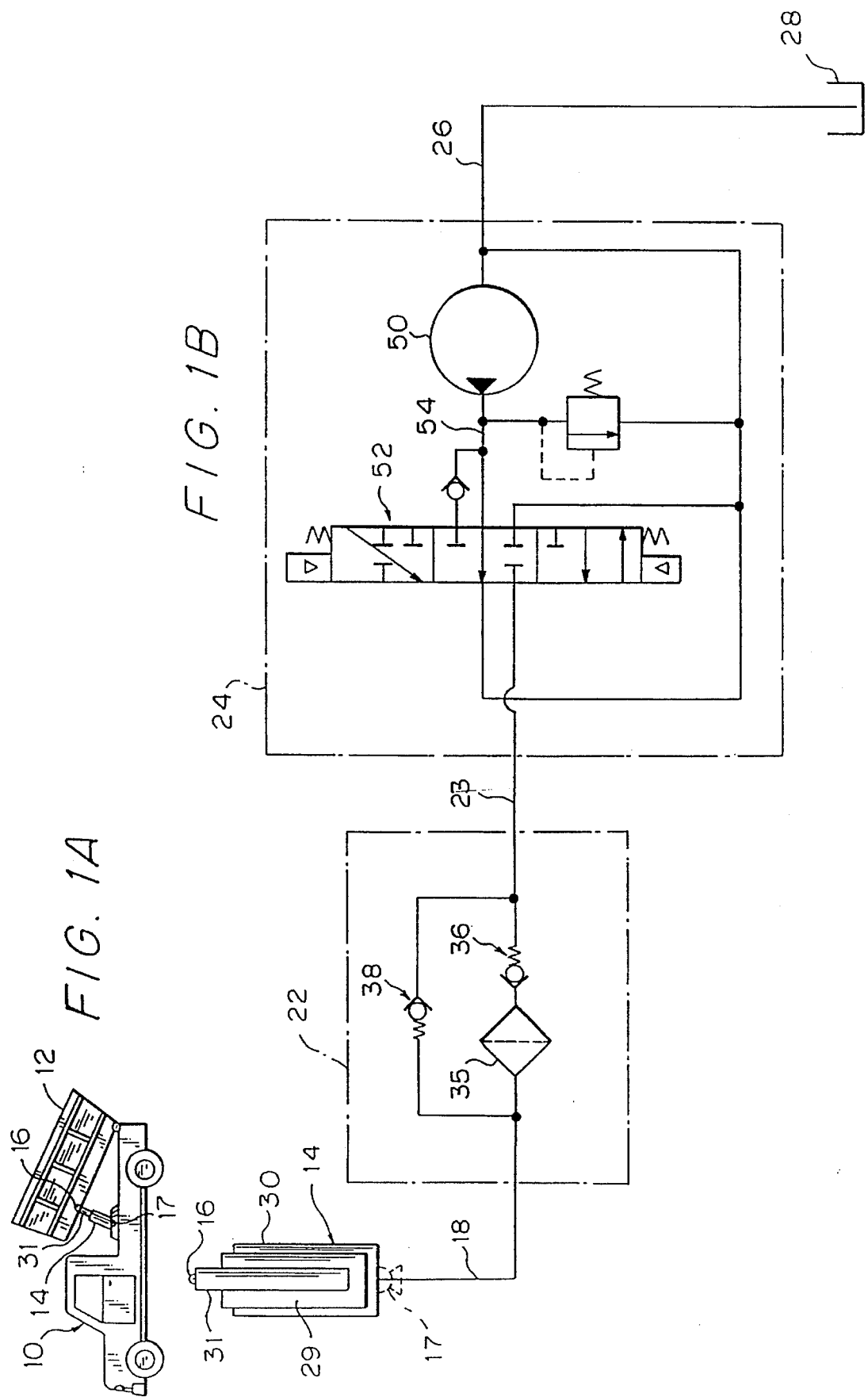
FIG. 1A is a side view of a dump truck which employs the features of the present invention.
FIG. 1B is a schematic illustration showing a first embodiment of an arrangement for filtering hydraulic fluid in two-line dump truck systems.

Referring now to FIGS. 1A and 1B, there is shown schematically a first, and a preferred, embodiment of the invention. A dump truck 10 has a dump bed 12 pivoted thereon. The dump bed 12 is raised and lowered by a single-action telescopic cylinder 14, which is pivoted at its bottom end by a pivot 16 to the frame of the truck 10 and, at its top end, by a pivot 17 to the dump bed 12. The single-acting telescopic cylinder 14 is connected by a first hydraulic line 18 to a filter assembly 22 which, in turn, is connected by a line 23 to a two-line dump pump assembly 24. The two-line dump pump assembly 24 is connected by a second hydraulic line 26 to a tank or sump 28 for storing hydraulic fluid. In the embodiment of FIG. 1, the filter assembly 22 is on the pressure side of the two-line sump pump assembly 24.

The single-acting, telescopic cylinder 14 includes a piston 29, which is mounted within a cylinder 30 and from which projects a piston rod 31, the piston rod 31 being pivoted to the dump truck bed 12 by the pivot 17. Upon pumping hydraulic fluid from the sump 28 with the two-line dump pump assembly 24, fluid is drawn through the line 26 and applied via line 23 through the filter assembly 22 (without being filtered) and into the cylinder 30 via the first hydraulic line 18. This causes the piston 29 to rise in the cylinder 30, thereby lifting the dump truck bed 12.

To lower the dump truck bed 12, the two-line dump pump assembly 24 no longer pressurizes the hydraulic fluid so that the hydraulic fluid can flow back down the first line 18 through the filter assembly 22 (the return fluid is filtered), through the dump pump assembly 24 and, thereafter, through the second hydraulic line 26 to the sump 28.

In accordance with the principles of the instant invention, the filter assembly 22 includes a filter element 35, which utilizes a filter medium to remove particulate contaminants from the hydraulic fluid. It has proven impractical to filter the hydraulic fluid as it is pumped; so prior art arrangements do not include a filter assembly 22, resulting in contaminated fluid damaging the components of the two-line dump pump assembly 24 and the single-acting telescopic cylinder 14. In accordance with the principles of the present invention, hydraulic fluid is only filtered as it returns from the single-acting telescopic cylinder 14 so that filtering will not interfere with pumping of the liquid.

Filtering of returning fluid by the filter element 35 is accomplished by providing oppositely oriented first and second one-way check valves 36 and 38, respectively. The first check valve 36 is a one-way check valve blocking flow toward to the telescopic cylinder 14 and allowing flow from the telescopic cylinder at a relatively low pressure, e.g., about 3 psi. The second one-way check valve 38 is positioned in parallel with both the filter element 35 and the first one-way check valve 36. The second one-way check valve 38 permits flow of hydraulic fluid from the pump assembly 24 through line 23 but blocks flow in line 18 from the telescopic cylinder 14. The one-way check valve 38 has a relatively high opening pressure of about 15 psi so that as the pumped hydraulic fluid flows through the valve 38 on the way to the telescopic cylinder 14, back pressure is generated in the line 23, which helps to seal closed the low pressure (3 psi) one-way check valve 36. It has been found that the hydraulic fluid is contaminated by both the operation of the two-line dump pump assembly 24 and the telescopic cylinder 14. Accordingly, filtering the return hydraulic fluid rather than the pressurized hydraulic fluid ensures that clean, filtered fluid is available for subsequent expansions of the single-acting telescopic cylinder 14.

While the two-line dump pump assembly 24 is pumping hydraulic fluid to raise the bed 12, the first one-way, check valve 36 remains closed while the second one-way check valve 38 opens, allowing the hydraulic fluid to bypass the filter element 35. The hydraulic fluid exerts pressure on piston 29 which extends piston rod 31 and raises the bed 12. When it is desired to lower the bed 12, the hydraulic fluid exerts pressure that closes the second, one-way, check valve 38 causing the fluid to flow through the filter element 35 and to open the first one-way, check valve 36 so that the hydraulic fluid can return to the sump 28 via the line 23, the two-line dump pump assembly 24 and the second line 26. In this way, only the return hydraulic fluid is filtered by filter element 35.

The two-line dump pump 24 is of a conventional structure and includes a hydraulic pump 50 connected to the sump 28 by the second line 26 and a conventional valve 52 shiftable between a hydraulic fluid transfer position, a stop position, and a fluid return position. When the valve 52 is in the fluid transfer position, hydraulic fluid from the pump 50 is conveyed over a line 54 through the valve to the line 23, which is connected to the filter assembly 22 so that the hydraulic fluid flows from the pump through the valve and into the first line 18 in order to extend to piston rod 31 of the single-acting telescopic cylinder 14. When the valve 52 is in the stop position, fluid no longer flows over line 23 to the single-acting telescopic cylinder 14 but remains in the cylinder 14 since it is blocked from flowing back through line 23. When the valve 52 is moved to its return position, fluid flows through line 23 back around the valve and through the line 54. The fluid then flows through the pump 50 and finally to the sump 28 via the second line 26.

Figure 2:
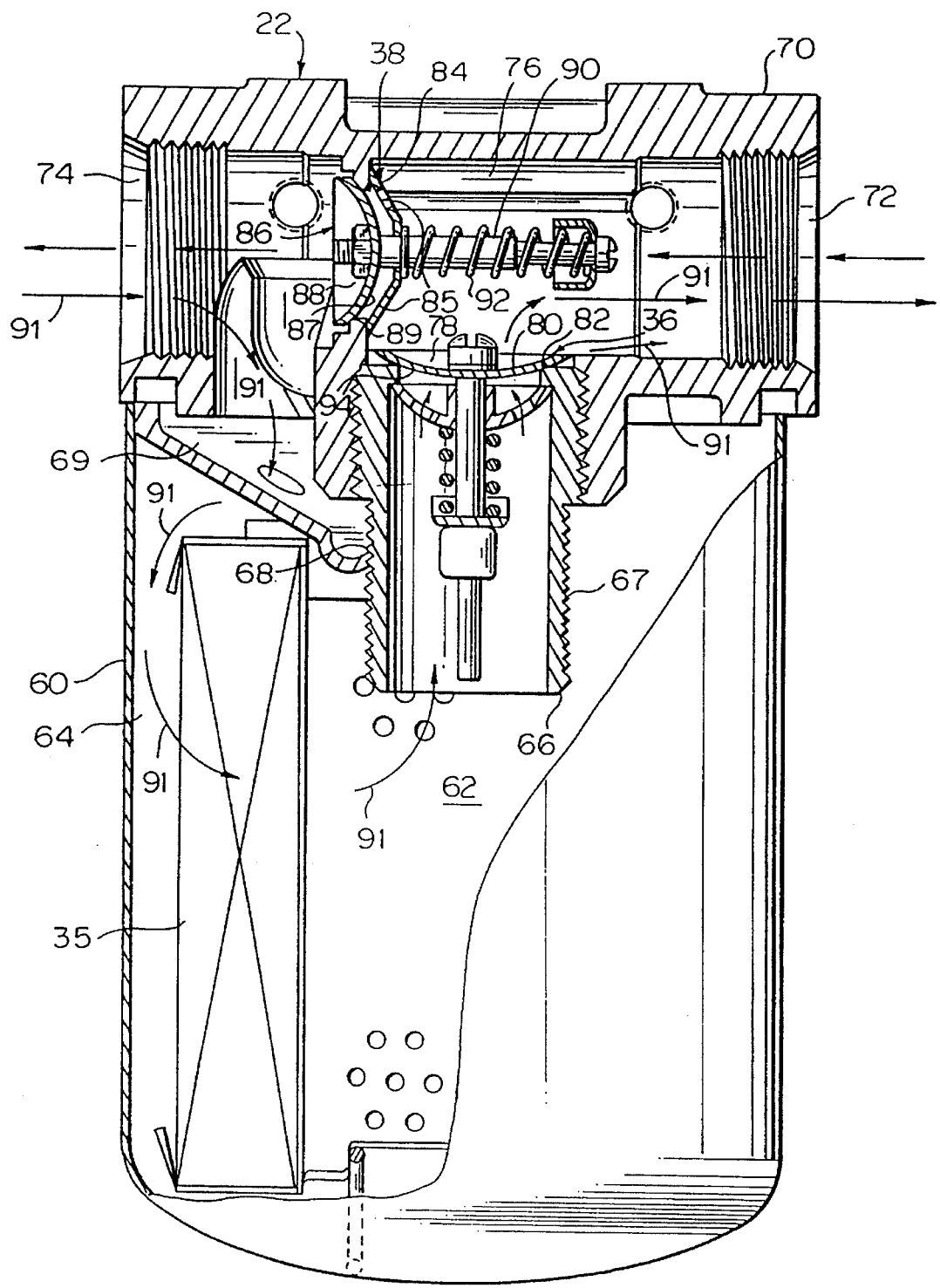
FIG. 2 is a side elevational view of a preferred hydraulic filter assembly employed in the filtering arrangements of FIG. 1.

FIG. 2: Preferred Configuration of the Filter Assembly 22

Referring to FIG. 2, there is shown a preferred embodiment for the filter assembly 22. The filter assembly 22 is a modification of the Dana Corporation's hydraulic filter Model No. FSE2, a line-type, spin-on filter assembly illustrated on pages 12 and 13 of Dana Corporation Catalog No. GP-3020, incorporated herein by reference.

The filter assembly 22 includes a housing 60 in which the filter element 35 is mounted. The filter element 35 is a cylindrical filter element, annular in cross section, to define a central space 62. Normally, hydraulic fluid is filtered by flowing into an outer annular space 64 surrounding the filter element 35 and then passing through the filter element into the central chamber 62, where it is exhausted through an outlet tube 66. The outlet tube 66 has external threads 67 which mate with a central opening 68 in an end plate 69 of the housing 60 so that the housing 60 is screwed onto the outlet tube 66 in the typical manner of a spin-on filter. The housing 60 and the filter element 35 are thus spin-on mounted on a base 70, which has a first port 72 and a second port 74. The first port 72 is attached to line 23 (FIG. 1), while the second port 74 is attached to the first line 18 (FIG. 1) which is connected to the single-acting, hydraulic cylinder 14. In accordance with the principles of the present invention, the first one-way check valve 36 is mounted within the outlet tube 66, while the second, one-way check valve 38 is mounted in a chamber 76, which connects the first port 72 to the second port 74.

When the system is operating to raise the dump bed 12, hydraulic fluid flows into the first port 72 and causes the first valve 36 to close by applying pressure to the convex surface 78 of a dished valve element 80 to press the dished valve element against a valve seat 82. Since the valve 36 is closed, hydraulic fluid is prevented from flowing down through the outlet tube 66 into the space 62 and thereafter through the filter element 35. The first one-way check valve 36 is therefore oriented to block flow from the pump 50 (FIG. 1) through the filter element 35.

The second one-way, check valve 38 is supported in the chamber 76 by a spider 84 having openings 85 therethrough. The check valve 38 has a dished valve element 86 with a convex surface 87 and a concave surface 88. The convex surface 87 seats against a valve seat 89. The dished valve element 86 is fixed to a stem 90 and urged to a closed position by a spring 92 which presses against the spider 84 and urges the stem toward the first port 72. When the fluid pressure is applied to the convex side 87 of the dished valve element 86, the valve element 86 moves to the left against the bias of the coil spring 92 mounted around the stem 90.

The pressurized hydraulic fluid then flows out of the second port 74 and through the first line 18 to the single-acting, telescopic cylinder 14 to extend the piston rod 31 (FIG. 1).

When the bed 12 (FIG. 1) is lowered, it pressurizes the hydraulic fluid in the first line 18 and hydraulic fluid through line 18. Hydraulic fluid returning through the first line 18 (FIG. 1) applies pressure to the convex surface 87 of the dished valve element 86 to press the convex surface 87 against the valve seat 89. This causes the return fluid to follow the path of the arrows 91 into the space 64 and through the filter element 35. The return fluid flows from the filter element 35 into the chamber 62 and opens the first valve 36 by pressing against the convex side 94 of the dished valve element 80 lifting the valve element 80 from the valve seat 82. This allows the hydraulic fluid to flow through the outlet tube 66 into the chamber 76 and out of the first port 72 so that it may return through line 23 to the pump and by the second line 26 to the sump 28 (see FIG. 1).

Figure 3:
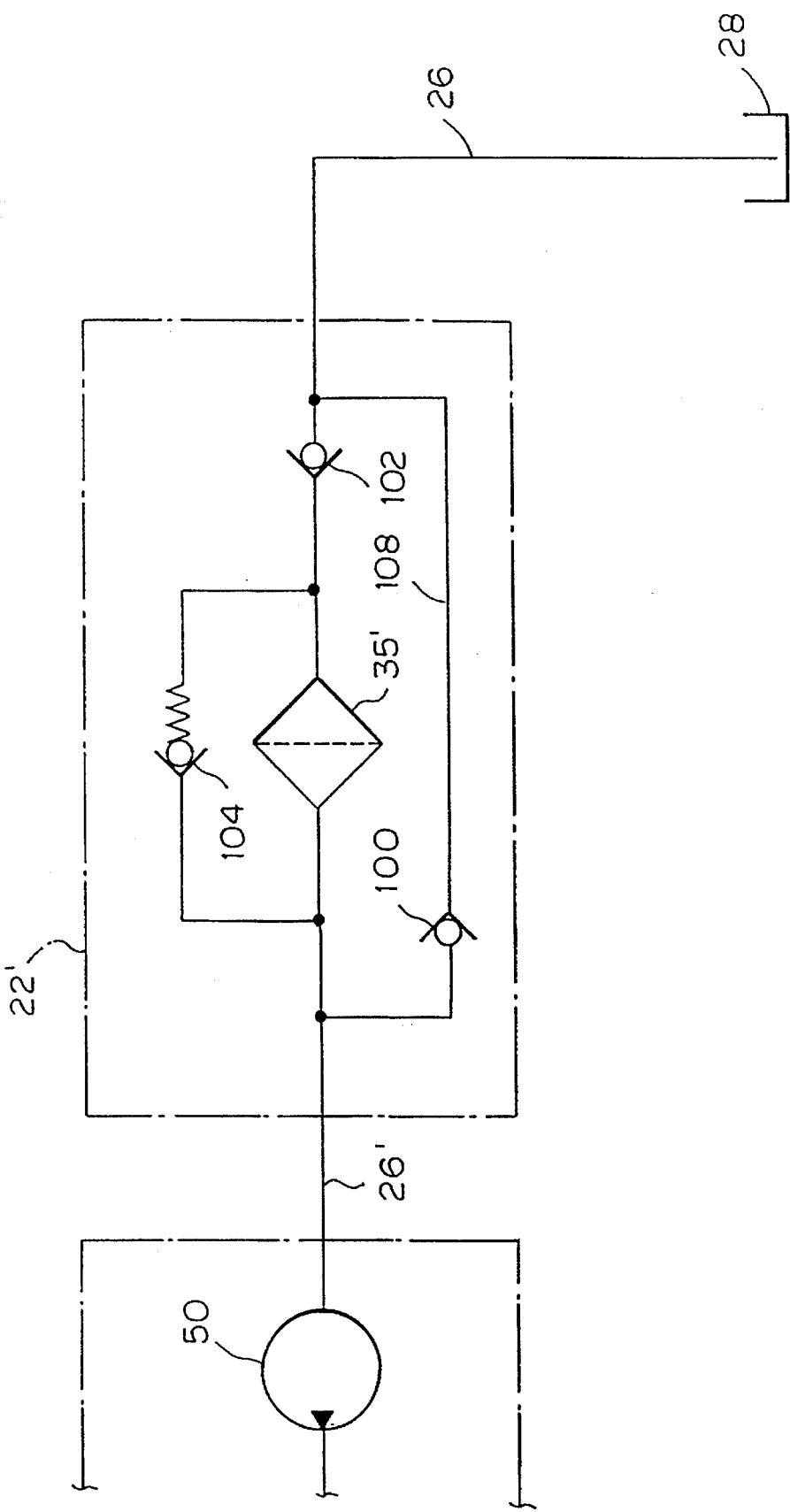
FIG. 3 is a schematic view of a second embodiment of an arrangement for filtering hydraulic fluid in a two-line dump truck arrangement.

FIG. 3: The Second Third Embodiment of the Invention

Referring now to FIG. 3, there is shown a second, and alternative, embodiment of the invention, wherein a filter assembly 22' is positioned in line 26' upstream of the pump, 50 between the sump 28 and the pump. Consequently, the filter assembly 22' is on the suction side of the pump 50. In the embodiment of FIG. 3, a filter element 35' has one-way check valves 100, 102, and 104 associated therewith. The check valves 100 and 102 are relatively low pressure check valves which open at a pressure of about ½-psi. The check valve 104 has a relatively high opening pressure of about 15 psi.

When the pump 50 is pumping to raise the bed 12 of the truck 10 (FIG. 1A), hydraulic fluid is drawn into line 26 and closes check valve 102. Since the check valve 102 is closed, fluid will flow over line 108 to open the check valve 100, allowing the fluid to flow to pump 50, thereby bypassing the filter element 35'. When the flow is reversed so as to return the hydraulic fluid from the cylinder 14, the fluid flows in the opposite direction in line 26 and closes the check valve 100. This causes the hydraulic fluid to flow through the filter element 35' to open the low pressure check valve 102 so that it can flow back down the line 26 to the sump 28.

Since the bypass check valve 104 is held closed by a relatively heavy spring and requires about 15 psi to open, relief for cold weather start ups is provided. In cold weather, the hydraulic fluid is viscous and may have difficulty traversing the interstices of the material comprising the filter element 35. Since the hydraulic fluid can open the check valve 104 due to a pressure greater than 15 psi, the pump bed will still lower if the filter element 35' is blocking flow of the hydraulic fluid.

The entire disclosures of all applications, patents, and publications cited herein are hereby incorporated by reference.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A spin-on assembly useable for connecting a hydraulic cylinder for a dump truck bed to a hydraulic pump the assembly comprising:

a single hydraulic line connecting the hydraulic cylinder to the hydraulic pump;

a base with a first port and a second port, the ports being connected by a chamber and connecting the single hydraulic line to one chamber;

an externally threaded outlet tube projecting from the chamber;

a spin-on housing having an end plate with a threaded central opening for threadably mounting the housing on the threaded outlet tube and inlet openings therethrough;

an annular filter element disposed in the housing, the annular filter element defining a central space into which the hydraulic fluid flows, the central space receiving the threaded outlet tube;

a first one-way check valve axially disposed in the threaded outlet tube in series with the filter element and in communication with both the central space of the annular filter element and the chamber in the base, the first one-way check valve being oriented and biased closed by a first spring exerting a first spring force to block fluid flow from the first port to the central space and to allow fluid flow at a first selected pressure exerting a force greater than the first force from the central space to the first port, and a second one-way check valve disposed in parallel with the filter element and positioned in the chamber between the first one-way check valve and the second port, the second one-way check valve being oriented and biased closed by a second spring exerting a second force to block fluid flow from the second port to the first port and to allow flow at a second selected pressure exerting a second force greater than the second spring force from the first port to the second port, the second selected pressure being substantially greater than the first selected pressure level whereby fluid pressure applied to the first port from the hydraulic pump applies a back pressure to keep the first one-way check valve closed while opening the second one-way check valve, and whereby fluid flow from the hydraulic cylinder into the second port at a pressure greater than the first pressure flows through the filter element into the central space, out through the first one-way check valve, into the chamber and out of the first port.

2. The arrangement of claim 1, further including a third one-way check valve connected in parallel with the filter element and the second one-way check valve, the third one-way check valve allowing flow therethrough from the hydraulic cylinder back to the sump upon the return pressure exceeded a selected level so as to bypass the filter element when the filter element offers excessive resistance and blocking flow from the pump to the hydraulic cylinder.

3. The assembly of claim 1, wherein the first one-way check valve has an opening pressure of about 3 psi and the second one-way check valve has an opening pressure of about 15 psi.

4. The improvement of claim 1, wherein the filter assembly is a spin-on type filter assembly with the first port being adapted for connection to a hydraulic pump and the second port being adapted for connection to a hydraulic cylinder whereby the filter element in the assembly filters only return fluid.

5. In combination, a dump truck bed lifted by a hydraulic cylinder connected by only a first line to a hydraulic pump which pumps fluid from a reservoir of hydraulic fluid connected to the pump by only a second line;

a spin-on filter assembly including a base with a first port and a second port, the ports being connected by a chamber with an externally threaded outlet tube projecting from the chamber, the filter assembly including a spin-on housing having an end plate with a threaded central opening for threadably mounting the housing on the threaded outlet tube and inlet openings therethrough;

an annular filter element disposed in the housing, the annular filter element defining a central space into which the hydraulic fluid flows; the central space receiving the threaded outlet tube;

a valve arrangement in the base comprising:

a first one-way check valve axially disposed in the threaded outlet tube in series with the filter element and in communication with both the central space of the annular filter element and the chamber in the base, the first one-way check valve being oriented and biased closed by a first spring exerting a first spring force to block fluid flow from the first port to the central space and to allow fluid flow at a first selected pressure exerting a force greater than the first force from the central space to the first port, and a second one-way check valve disposed in parallel with the filter element and positioned in the chamber between the first one-way check valve and the second port, the second one-way check valve being oriented and biased closed by a second spring exerting a second force to block fluid flow from the second port to the first port and to allow flow at a second selected pressure exerting a second force greater than the second spring force from the first port to the second port, the second selected pressure being substantially greater than the first selected pressure, whereby fluid pressure applied to the first port from the hydraulic pump applies a back pressure to keep the first one-way check valve closed while opening the second one-way check valve, and whereby fluid flow from the hydraulic cylinder into the second port at a pressure greater than the first pressure flows through the filter element into the central space, out through the first one-way check valve, into the chamber and out of the first port.

6. The combination of claim 5, wherein the first one-way check valve has an opening pressure of about 3 psi and the second one-way check valve has an opening pressure of about 15 psi.

* * * * *